ns Patent Office
3,468,335
Patented Sept. 23, 1969

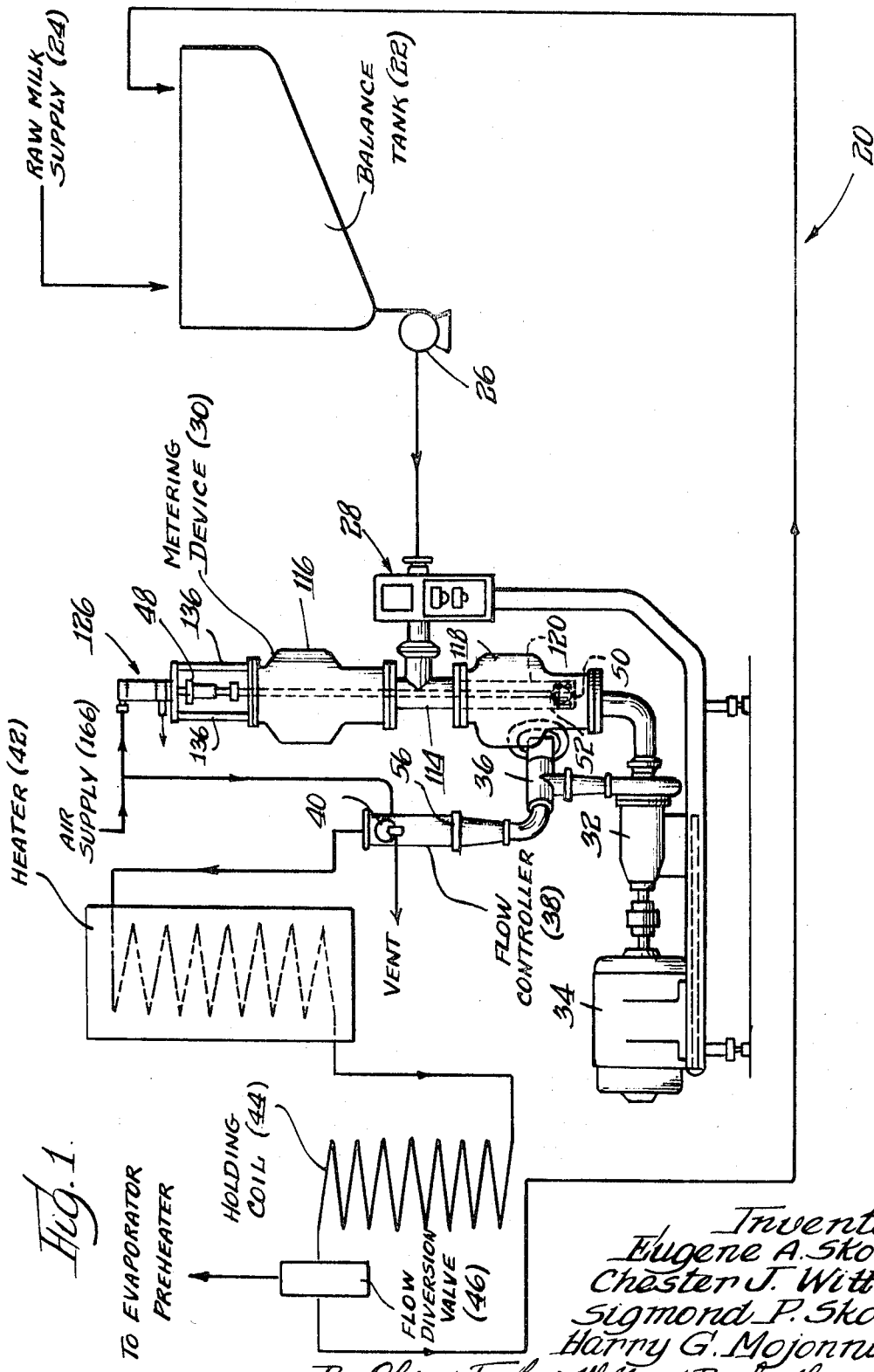

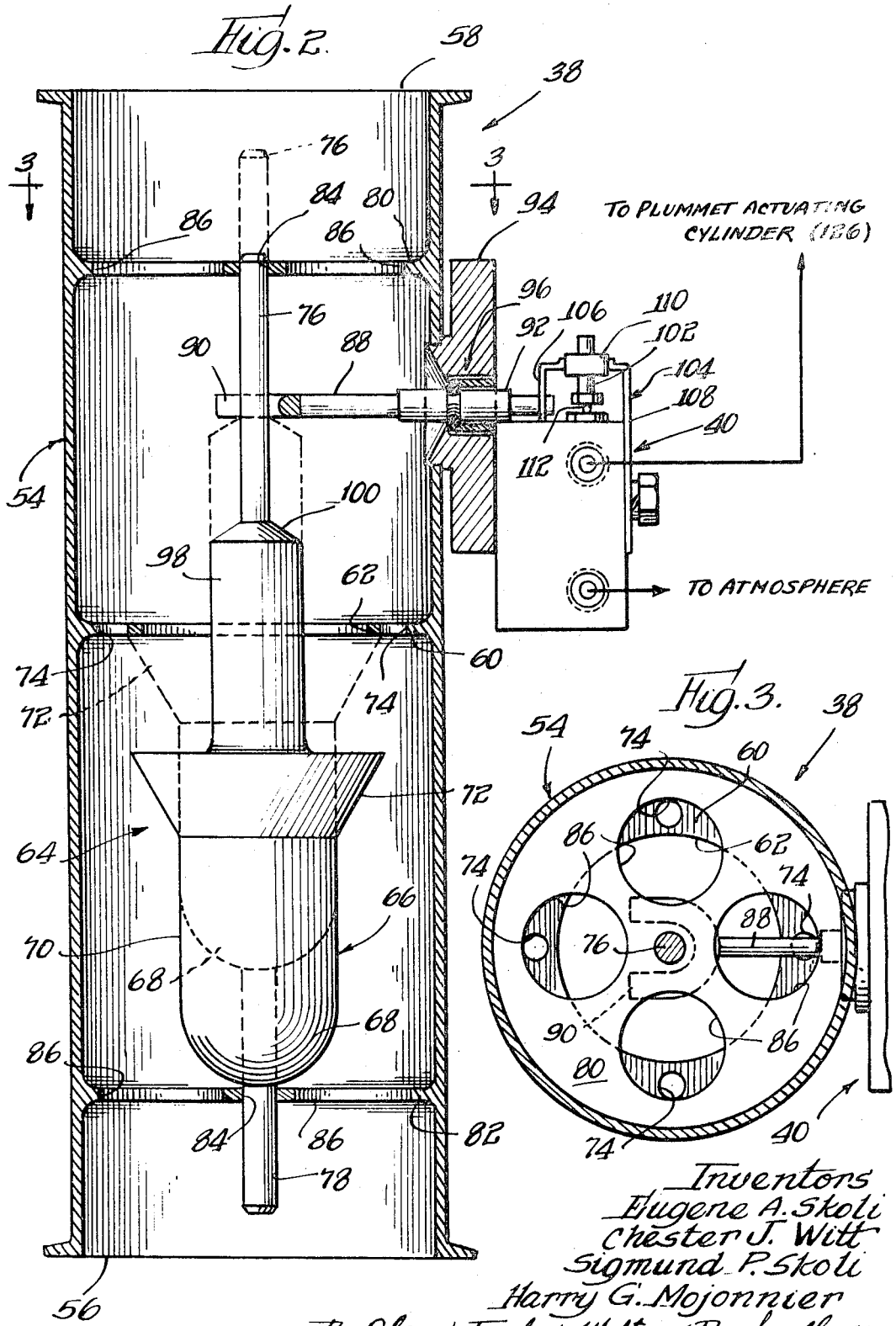

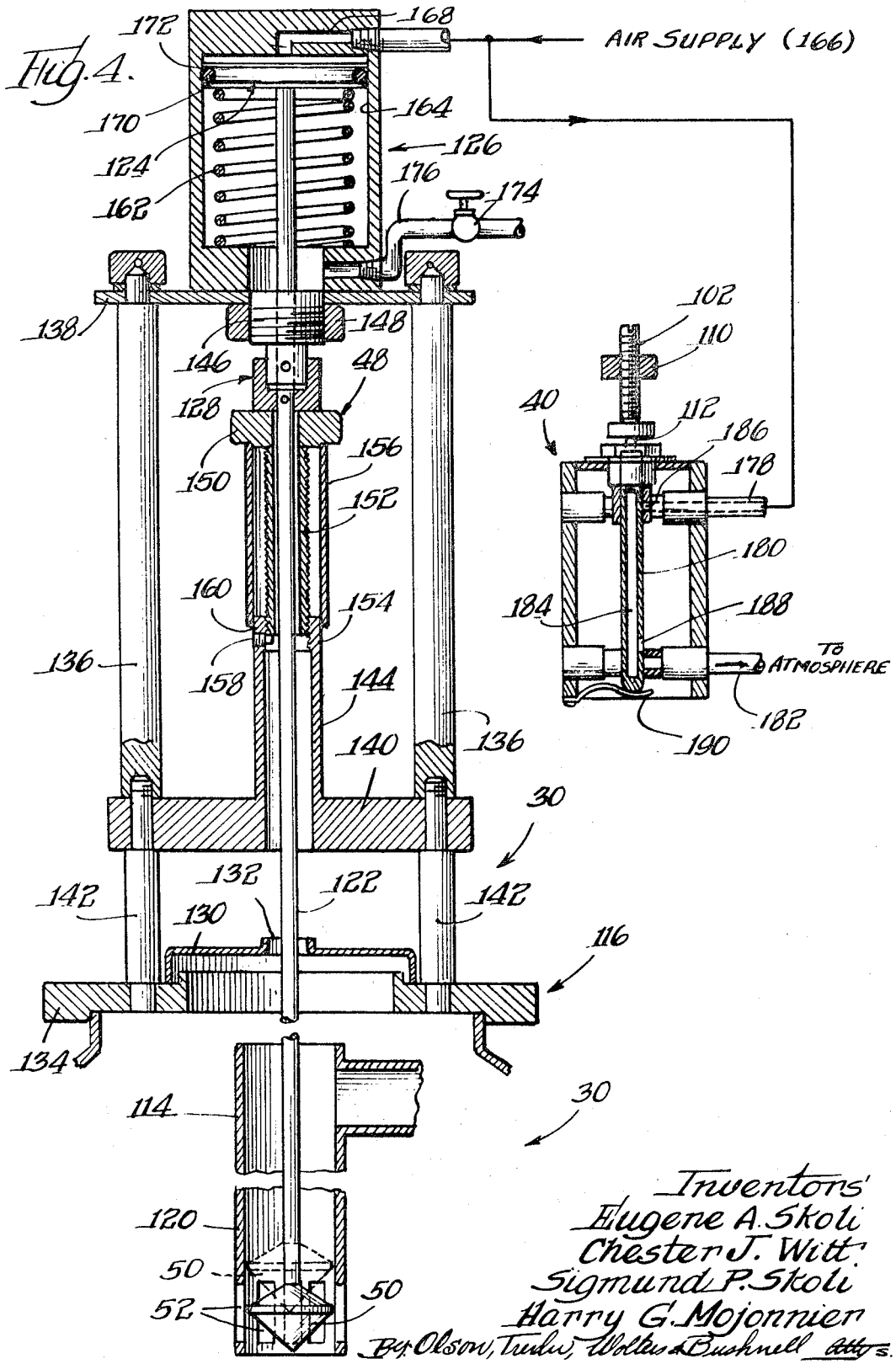

3,468,335
FLOW LIMIT DEVICE
Eugene A. Skoli, Harwood Heights, Chester J. Witt, Deerfield, Sigmund P. Skoli, Elmwood Park, and Harry G. Mojonnier, River Forest, Ill., assignors to Mojonnier Bros. Co., Chicago, Ill., a corporation of Illinois
Filed Dec. 22, 1967, Ser. No. 692,871
Int. Cl. F16k *17/28;* G01f *1/00*
U.S. Cl. 137—486                                        10 Claims

ABSTRACT OF THE DISCLOSURE

Apparatus for throttling fluid flow at rates above a selected maximum in which a fluid-transmitting duct has a partition with a flow-control orifice. A surge-responsive plummet is situated in the duct for selectively reducing flow through the orifice, and a sensing member is disposed in the duct to respond to the presence of the plummet in its flow-reducing position for developing a corresponding control signal.

---

This invention relates generally to process equipment and more particularly to devices for automatically throttling and controlling surges of fluid in continuous flow process equipment.

One important use of constant flow devices is in the dairy industry where, for example, pasteurization can be determined by the time required for a known volume of milk to pass through a coil maintained at an appropriate temperature. Other types of food processing equipment and certain tubular reactors also rely on the close regulation of volumetric flow to determine the extent of a process variable such as heat exposure. Positive displacement pumps have been commonly employed in these applications for delivering a specified quantity of fluid under conditions of varying head or pressure; and such pumps have the advantage that, as the parts wear, there is a decrease in the amount of fluid which is delivered. Thus, the extent of exposure tends to increase, avoiding under-processing. Nevertheless, positive displacement pumps are not generally suitable for handling abrasive liquids or those tending to leave residues. Furthermore, pumps of this type frequently must be dismantled for cleaning. Accordingly, centrifugal pumps are sometimes arranged with a variable orifice device, such as a control valve, in either the discharge or suction line to regulate a constant flow. However, the latter arrangements are susceptible of delivering more than the intended flow under surge conditions.

Therefore, an important object of the present invention is to provide apparatus for automatically throttling flow under surge conditions.

A more general object of the invention is to provide new and improved apparatus for establishing substantially constant rates of flow not exceeding a predetermined maximum value.

Another object of the invention is to provide surge control apparatus which automatically resets itself when the system returns to normal pressure conditions.

These and other objects and features of the invention will become more apparent from a consideration of the following descriptions.

In the drawings:

FIG. 1 is a partially schematic view of a flow controller in accord with the invention embodied in an apparatus module for delivering pasteurized milk to the preheater of an evaporator;

FIG. 2 is an enlarged, central sectional view of the flow controller used in the apparatus module of FIG. 1;

FIG. 3 is a cross-sectional view taken substantially along the line 3—3 of FIG. 2; and FIG. 4 is an enlarged, central sectional view of the metering device employed in conjunction with the flow controller in the apparatus module of FIG. 1.

Referring now in detail to the drawing, specifically to FIG. 1, an equipment arrangement or apparatus module indicated generally by the reference numeral 20 is shown to comprise a balance tank 22 which receives raw milk from a supply 24. The milk is exhausted from the tank 22 by a centrifugal pump 26, pump 26 delivering the milk under pressure to a product inlet unit 28 that includes a valve, not shown. The flow of milk exiting from the inlet unit 28 is regulated by a metering device 30 which includes an adjustable orifice as will be described more fully hereinafter. A centrifugal pump 32 which is driven by a suitably energized motor 34 withdraws milk from the metering device 30 and passes it to a diaphragm valve 36 which is connected in series fluid circuit with a flow limit device or controller 38, controller 38 including a pneumatic switch 40 as will be described more fully hereinafter. From flow controller 38, the milk passes to a heater 42 and thence to a holding coil 44 in which the milk achieves pasteurization. The heat-processed milk is delivered to the evaporator preheater through a flow diversion valve 46 having a by-pass line for recycling milk to balance tank 22.

In use of the equipment arrangement 20, the target rate of flow is established by means of the metering device 30. A metering adjusting screw 48 determines the normal position of a diploconical metering plug 50 with respect to a series of vertical flow control slots 52 whereby to establish the open area of an adjustable orifice. This normal rate of flow serves to regulate the time that a given volume of milk resides in the holding coil 44; and this time period, in turn, establishes the heat process or pasteurization cycle for the milk being delivered to the evaporator preheater. Surges in the flowing milk are throttled by the controller 38 as will be described more fully hereinafter.

Turning to FIGS. 2 and 3 for a description of the construction of flow controller 38, that unit compries, in compliance with the features of the present invention, a tubular chamber or duct 54 having walls which define a fluid inlet 56 and a fluid outlet 58. Between inlet 56 and outlet 58, the duct 54 includes a partition member 60 which is disposed across the path of flow and which is fashioned with a central aperture 62, aperture 62 establishing a flow-control orifice. A plummet device 64 is disposed in the duct 54 and includes a surge-responsive plummet member 66 which is fashioned to respond to excess fluid pressure for selectively reducing the flow through the orifice defined by aperture 62. More specifically, the plummet member 66 includes a tapering nose portion 68 which confronts inlet 56, a cylindrical medial portion 70, and a flared bell flange portion 72 which is disposed generally downstream from nose portion 68. The shape of plummet member 66 enables it to respond to surges in the fluid flowing between inlet 56 and outlet 58 and, once it is in position closing the orifice of aperture 62, to remain in such position until the conditions causing the surge have been alleviated.

In the illustrated embodiment, the plummet member 66 is intended to take a flow-terminating position with respect to the orifice of aperture 62, the bell flange portion 72 fitting tightly about the edges of aperture 62 as it shown in broken line in FIG. 2. In the flow-reducing condition of plummet device 64, it is sometimes desirable that a modest flow continue through the duct 54; and for this purpose, the partition member 60 is perforated with a suitable number of appropriately sized by-pass holes 74 disposed radially outwardly of the perimeter of bell flange portion 72. The holes 74 permit a modest flow of fluid when the plummet device 64 is in its flow-terminating position. It is recognized that other means of shunting a modest flow of fluid may be employed; and providing the bell flange portion 72 with peripheral grooving or other perforations is considered equivalent to perforating the partition member 60.

In order to direct movement of the plummet member 66 axially of the duct 54, the plummet device 64 includes an upper rod member 76 and a lower rod member 78 which extend from the plummet member 66 in opposite directions coaxial therewith. Cooperatively, the duct 54 is provided with an upper guide plate member 80 and a lower guide plate member 82, guide plate members 80 and 82 being connected to the walls of duct 54 on opposite sides of the partition member 60 to cooperate respectively with the upper rod member 76 and the lower rod member 78. Each of the guide plate members 80 and 82 is fashioned with a central guide aperture 84 for slidably receiving the associated rod member. In addition, each of the guide plate members 80 and 82 is fashioned, radially outwardly of the guide aperture, with a suitable number of generously sized apertures 86 which serve to pass fluid through duct 54 in a relatively unobstructive manner.

The flow controller 38 also includes a sensing member in the duct 54 for responding to the presence of the plummet member 66 in its flowing-reducing position whereby to develop a corresponding control signal. In the illustrated embodiment, this sensing member comprises a lever 88 disposed transversely of the duct 54 and having an inner end portion terminating in a U-shaped yoke portion 90. The lever 88 additionally includes an outer end portion 92 which extends through a wall of the duct 54 to actuate the pneumatic switch 40. A mounting plate 94 is secured to the wall of duct 54 to support the switch 40 in proper position, plate 94 being provided with a fulcrum unit 96 which rockably seals the lever 88 with respect to the duct 54. For cooperating with the yoke portion 90 of lever 88, the plummet device 64 includes a stem portion 98 between bell flange portion 72 and the upper rod member 76. The stem portion 98 is of generally greater diameter than the upper rod member 76 to define an upstream-facing shoulder 100 which is positioned to engage the yoke portion 90 forcibly when the plummet member 66 is in its flow-reducing position relative to the orifice of aperture 62. The rocking motion which is imparted to the lever 88 by this engagement is transmitted to an adjustably positionable actuating screw 102, screw 102 being carried by a flexible, inverted U-shaped bracket 104. The bracket 104 includes a leg 106 device 30 comprises a medial T fitting 114 which is suitably secured to the housing of pneumatic switch 40. The screw 102 is threaded in a nut 110 that is carried by the bracket 104 and positioned so as to locate the screw in actuatable alignment with a valve operator 112 whose function will be described more fully hereinafter with respect to FIG. 4.

Returning to FIG. 1 for the moment, the metering device 30 comprises a metal T fitting 114 which is connected to the product inlet unit 28, an upper vessel member 116 which is open to the T fitting 114, and a lower vessel 118. A tubular extension 120 of the T fitting 114 extends into the lower vessel 118 and carries the flow control slots 52 in arcuately spaced relationship, the flow of milk into lower vessel 118 being achieved exclusively through the extension 120.

With reference to FIG. 4, the metering plug 10 of device 30 it attached to the lower end of a shaft 122. The upper end of shaft 122 is attached to a piston 124 of a pneumatic jack 126 by means of a coupling 128. The upper vessel 116 of device 30 includes a cover 130 having a tubular throat for passing the shaft 122, and the upper vessel additionally comprises a top plate 134 upon which the jack 126 is mounted by means of support bars 136, a bracket plate 138, a calibrating plate 140 and calibrating plate bars 142, the calibrating plate 140 including an upstanding sleeve 144 that surrounds shaft 122 spaced radially apart therefrom.

The coupling 128 defines a traveling abutment for use in establishing the limits of movement for the metering plug 50. Cooperatively, the bracket plate 138 is fitted with a threaded sleeve 146 encircling the shaft 122, and a jam nut 148 is threaded onto the sleeve 146 to define the upstop for coupling 128.

The metering adjust screw 48 includes a handwheel 150 which serves as the adjustably positionable downstop for the coupling 128; and for purposes of positioning the handwheel 150, screw 48 includes an externally threaded shank 152 which is threadedly engaged with a nut portion 154 formed on the upper end of sleeve 144, turning of handwheel 150 in an appropriate direction engaging or disengaging the threaded shank 152 and the nut 154 whereby to locate the handwheel 150 vertically. Advantageously, the screw 48 includes a protective sleeve 156 which telescopes over the sleeve 154; and desirably, a lock plug 158 of nylon resin or the like is threaded into a radial aperture 160 in nut 154 frictionally engaging the threaded shank 152 for use in preserving a selected relative position thereof.

The shaft 122 and the metering plug 50 are biased generally in the upward direction by means of a compression spring 162 that is disposed in cylinder 164 of jack 126 beneath the piston 124. Operating air is introduced into the cylinder 164 from a supply 166 through a passageway 168 formed in the upper head of the cylinder and opening into the headspace above the piston 124. To prevent leakage of air around piston 124, the piston is formed with a peripheral groove 170 which receives a toroidal gasket 172. Venting of the cylinder 164 is achieved by means of a manually operable valve 174 situated in a conduit 176 which leads from the lower head of the jack cylinder.

Under ordinary conditions, air under pressure from the supply 166 lowers the piston 124 bringing coupling 128 into abutting contact with handwheel 150, thus positioning the metering plug 50 in partially obstructing or metering relationship relative to the slots 52. However, upon actuation of the normally closed switch 40 by lever 88, an exhaust pathway is established from the air supply through a conduit 178, a tubular valve element 180 in the pneumatic switch and through conduit 182 which is open to the atmosphere. In order to communicate the conduits 178 and 182, the tubular valve element 180 is fashioned with a central bore 184 and vertically spaced lateral ports 186 and 188. Furthermore, a leaf spring 190 biases the valve element 180 upwardly and into a position wherein the solid wall of the valve element obstructs the openings into conduits 178 and 182.

In the ordinary operation of the equipment, milk flowing into the T fitting 114 of metering device 30 will be controlled as to its volumetric flow by the opening established at the slots 52 by the metering plug 50. As will be recognized, the screw 48 determines this normal position of the plug 50 through establishing the downstop position of coupling 128. In the event that a surge of excessive flow shall occur, the increased velocity of the flowing milk will cause the plummet device 64 to rise from its normal position shown in solid outline in FIG. 2 to its flow-reducing position shown in broken outline. This action will automatically reduce the discharge flow into the heater 42. Simultaneously, the stem portion 98 of the plummet device will lift the yoke 90 of lever 88 causing the screw 102 to depress the valve operator 112 on element 180 and open the switch 40. Thus relieved of air pressure, the piston 124 will rise under the influence of biasing spring 162 lifting the metering plug 50 into the position shown in dotted outline in FIG. 4 where it will reduce the discharge flow from the metering device 30 to the controller 38. With the flow to the controller 38 thus retarded, the plummet device 64 will drop away from the aperture 62 and the lever 88 releasing the pressure on valve operator 112 and permitting spring 190 to return the valve element 180 to its normal, closed condition. Air from the supply 166 thereupon will build up pressure behind the piston 124 gradually returning the metering device 30 to normal condition and automatically restoring the selected rate of flow through the equipment.

As will be recognized, the plummet device 64 locks in under the full pressure of centrifugal pump 32 in the flow-reducing condition and in a specific embodiment of the invention a plummet device with an effective surface area of five square inches is forced into engagement with partition member 60 with a 400 pound force by means of a pump delivering 80 p.s.i.g.

The invention is claimed as follows:

1. Apparatus for controlling fluid flow comprising: duct means having walls defining a fluid inlet and a fluid outlet and having a partition member disposed across the path of flow from said inlet to said outlet, said partition member having aperture means defining a flow-control orifice; plummet means in said duct means, including a surge-responsive plummet member between said inlet and said partition member for selectively reducing flow through said orifice; and signal means, including a sensing member in said duct means responsive to the presence of said plummet member in its flow-reducing position for developing a corresponding control signal.

2. Apparatus according to claim 1 wherein said plummet member has a tapering nose portion confronting said inlet and an outwardly flared bell flange portion disposed in a position generally downstream from said nose portion.

3. Apparatus according to claim 1 wherein said plummet means further includes rod members extending axially from said plummet member in opposite directions and wherein said duct means further includes guide members connected to the walls thereof on opposite sides of said partition member slidably receiving said rod members to direct the movement of said plummet member.

4. Apparatus according to claim 1 wherein said flow-reducing position is a flow-terminating position and wherein said partition member further includes by-pass hole means for transmitting a modest flow of fluid when said plummet member is in its flow-terminating position.

5. Apparatus according to claim 1 wherein said sensing member is a lever positioned to be rockably engaged by said plummet means and having a portion extending through a wall of said duct means and wherein said signal means further includes a valve actuatably engaged by said extending lever portion when said plummet member is in said flow-reducing position.

6. Apparatus according to claim 1 which further comprises flow-arresting means in series fluid circuit with said duct means and operatively connected to said signal means for actuation thereby.

7. Apparatus according to claim 6 wherein said flow-arresting means is a metering plug and wherein said apparatus further comprises adjustable positionable orifice means coopertively disposed with said metering plug.

8. Apparatus according to claim 6 wherein said sensing member is a lever positioned to be rockably engaged by said plummet means and having a portion extending through a wall of said duct means, wherein said signal means further includes a pneumatic valve actuatably engaged by said extending lever portion when said plummet member is in said flow-reducing position, and wherein said apparatus further comprises a pneumatic jack having a piston connected to said flow-arresting means and having a cylinder connected in pneumatic circuit with said valve.

9. Apparatus according to claim 6 wherein said flow-reducing position is a flow-terminating position and wherein said partition member further includes by-pass hole means for transmitting a modest flow of fluid said plummet member is in its flow-terminating position.

10. Apparatus according to claim 6 wherein said plummet member has a tapering nose portion confronting said inlet and an outward flared bell flange portion disposed in a position generally downstream from said nose portion.

References Cited
UNITED STATES PATENTS

| | | | |
|---|---|---|---|
| 859,088 | 7/1907 | Lindmark | 73—210 |
| 1,466,412 | 8/1923 | Samian | 137—406 XR |
| 2,868,225 | 1/1959 | Wigham et al. | 73—207 XR |

HENRY T. KLINKSIEK, Primary Examiner

U.S. Cl. X.R.
73—207; 137—565

UNITED STATES PATENT OFFICE
CERTIFICATE OF CORRECTION

Patent No. 3,468,335                    September 23, 1969

Eugene A. Skoli et al.

It is certified that error appears in the above identified patent and that said Letters Patent are hereby corrected as shown below:

Column 3, lines 50 and 51, "device 30 comprises a medial T fitting 114" should read -- which is fastened to the lever 88 and a leg 108 --; line 58, "metal" should read -- medial --; line 66, "10" should read -- 50 --. Column 6, line 29, after "fluid" insert -- when --; line 33, "outward" should read -- outwardly --.

Signed and sealed this 27th day of October 1970.

(SEAL)
Attest:

Edward M. Fletcher, Jr.                WILLIAM E. SCHUYLER, JR.
Attesting Officer                       Commissioner of Patents